(12) United States Patent
Voss

(10) Patent No.: US 7,566,982 B2
(45) Date of Patent: Jul. 28, 2009

(54) METHOD FOR CONTROLLING AND ADJUSTING A WIND TURBINE

(75) Inventor: Eberhard Voss, Jornstorf (DE)

(73) Assignee: Nordex Energy GmbH, Norderstedt (DE)

( * ) Notice: Subject to any disclaimer, the term of this patent is extended or adjusted under 35 U.S.C. 154(b) by 471 days.

(21) Appl. No.: 11/596,779

(22) PCT Filed: May 4, 2005

(86) PCT No.: PCT/EP2005/004842

§ 371 (c)(1),
(2), (4) Date: Nov. 16, 2006

(87) PCT Pub. No.: WO2005/116445

PCT Pub. Date: Dec. 8, 2005

(65) Prior Publication Data

US 2009/0079192 A1    Mar. 26, 2009

(30) Foreign Application Priority Data

May 18, 2004    (DE) .................. 10 2004 024 564

(51) Int. Cl.
F03D 7/02      (2006.01)
F03D 9/00      (2006.01)
H02P 9/04      (2006.01)
(52) U.S. Cl. ......................... 290/44; 322/24
(58) Field of Classification Search .................. 290/44
See application file for complete search history.

(56) References Cited

U.S. PATENT DOCUMENTS

| | | | | |
|---|---|---|---|---|
| 4,333,018 A | * | 6/1982 | Bottrell | 290/55 |
| 6,946,751 B2 | * | 9/2005 | Yoshida et al. | 290/44 |
| 7,095,129 B2 | * | 8/2006 | Moroz | 290/44 |
| 7,394,166 B2 | * | 7/2008 | Teichmann et al. | 290/44 |
| 7,436,083 B2 | * | 10/2008 | Shibata et al. | 290/44 |
| 2007/0132247 A1 | * | 6/2007 | Galayda et al. | 290/44 |

FOREIGN PATENT DOCUMENTS

| | | | |
|---|---|---|---|
| DE | 2742559 B | * | 10/1978 |
| DE | 197 17 059 C1 | | 7/1988 |
| DE | 195 32 409 A1 | | 3/1997 |
| DE | 196 44 705 A1 | | 4/1998 |

(Continued)

Primary Examiner—Joseph Waks
(74) Attorney, Agent, or Firm—Vidas, Arrett & Steinkraus, P.A.

(57) ABSTRACT

A method for controlling and adjusting a wind power installation having a nacelle displaceable by an azimuth angle, at least one rotor blade displaceable about its longitudinal axis and a power supply in a spinning mode, wherein the method comprises the following steps: a control unit determines an angular position for the nacelle from measured values (v) of wind velocity and wind direction and one or more displacement angles for the at least one rotor blade upon a measured wind velocity exceeding a predetermined speed value ($v_1^*$, $v_2^*$), at least one azimuth drive fed by the power supply sets the nacelle into the angular position ($\alpha$) determined by the control unit, and at least one pitch drive fed by the power supply sets the at least one rotor blade into the angular position ($\phi$) determined by the control unit, wherein the at least one rotor blade rotates in the set position at a rotational speed within a predetermined range of rotational speed.

13 Claims, 3 Drawing Sheets

FOREIGN PATENT DOCUMENTS

| | | |
|---|---|---|
| DE | 197 31 918 A1 | 1/1999 |
| DE | 200 20 232 U1 | 2/2002 |
| DE | 101 06 208 C2 | 12/2002 |
| DE | 100 58 076 C2 | 6/2003 |
| DE | 20 2004 009 071 U1 | 9/2004 |
| EP | 1 128 064 A2 | 2/2001 |
| EP | 1 286 049 A2 | 8/2002 |
| EP | 1 429 025 A1 | 12/2002 |
| WO | 90/07823 | 6/1990 |
| WO | 02/44561 A1 | 6/2002 |

* cited by examiner

METHOD FOR CONTROLLING AND ADJUSTING A WIND TURBINE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method for controlling and adjusting a wind power installation as well as the wind power installation itself.

A method of operating a wind power installation which increases the output of the wind power installation and at the same time limits the load at high wind velocities is known from DE 195 32 40 9 A1, the entire contents of which is incorporated hereby by reference in its entirety. For this purpose, the power of the wind power installation is reduced as of a predetermined cut-out wind velocity by limiting the operating rotational speed of the rotor of the wind power installation. In this known wind power installation, same does not shut off completely upon reaching the critical speed but rather the operating rotational speed of the wind power installation is forcibly reduced as soon as an inflow velocity exceeds the critical speed value. The wind power installation hereby continues to be operated above the customary "cut-out velocity" so that the power curve extends to greater wind velocities and the energy output as well as the grid compatibility of the wind power installation is improved.

A wind power installation having pitch-controlled rotor blades is known from EP 1 286 049 A2, the entire contents of which is incorporated hereby by reference in its entirety. A stationary park position is provided for the wind power installation which reduces the load on the wind power installation. The wind power installation is stabilized in the park position by actively controlling the rotor blade adjustment. Should, for example, the rotor blade deviate from the park position due to turbulence, a control action works to counter this deviation. For this purpose, the adjustment range of the rotor blades is extended so that it can produce a torque opposite to the usual direction of rotor rotation.

Known from DE 100 58 076 C2, the entire contents of which is incorporated hereby by reference in its entirety, is a method for controlling a wind power installation in which the nacelle is brought into a predetermined azimuthal position above a cut-out velocity, whereby the rotor blades are at the same time brought into their flag position for the azimuthal position. The control process in particular dispenses with an azimuth brake and a rotor brake so that the inflowing wind automatically sets the leeward rotors in the position of lowest wind resistance. By setting an azimuthal position for the rotor blades brought into their flag position, the known method avoids the need for tracking relative the main wind direction.

DE 197 17 059 C1, the entire contents of which is incorporated hereby by reference in its entirety, describes a wind power installation having two park positions for the nacelle. In a first park position, the nacelle points in the windward direction, the rotor blades receiving flow over the rear edge. In the second park position, the nacelle is moved into a leeward position to the tower of the wind power installation in which the rotor blades receive flow over the front edge. In the second position, the nacelle is released mechanically and is tracked upon changes in wind direction.

BRIEF SUMMARY OF THE INVENTION

The object of the present invention is to provide a method for controlling a wind power installation which reduces the load on the wind power installation at high wind velocities and which ensures continued supply to the wind power installation in the event of any power system outage.

The method according to the invention is based on the control and adjustment of a wind power installation having a nacelle, at least one rotor blade and a power supply. The azimuth angle of the nacelle is adjustable. The one rotor blade or plurality of rotor blades are in each case adjustable about their longitudinal axis, this adjustment is known as pitch adjustment. In the method according to the invention for spinning mode, a control unit determines an angular position for the nacelle and one or more displacement angels for the at least one rotor blade from the measured wind velocity and wind direction values upon a measured wind velocity exceeding a predetermined speed value. In this operating mode of the wind power installation resulting from the exceeding of a predetermined speed value, the control unit calculates the target angle for the azimuth and pitch adjustment. The predetermined angular adjustment is set by an azimuth drive and a pitch drive, wherein both drives are fed by the power supply.

The control unit determines the angle to be set such that the at least one rotor blade rotates at a rotational speed within a predetermined range of rotational speed. The invention is based on the premise that rotation should also continue to occur in the operating mode according to the invention so that upon heavy wind, the installation is subject to less load and/or power can continue to be produced by means of an auxiliary generator. The method according to the invention has two essential applications. In the one case of power being supplied by, for example, the main power supply, or in some other way, a high predetermined speed value is selected, for example in the range of the cut-out velocity, so that the wind power installation will enter into spinning mode upon high wind velocities. In so doing, the rotor is not arrested but rather can continue to turn at a lower rotational speed. A second application of the method according to the invention is when the main power supply or the connection to same fails such that electricity produced by the generator can no longer be supplied and consumers in the wind power installation cannot be supplied on a sustained basis. In this case, a very low predetermined speed is selected such that the method according to the invention can also be used during regular wind conditions. The wind power installation in this case turns at a rotational speed within a predetermined range of rotational speed and thus produces the power necessary for the supply in spinning mode.

In a preferred design, the control unit determines the target value(s) for the displacement angle for the at least one rotor blade dependent on the calculated azimuth angle and other variables such as, for example, actual rotational speed, wind direction and wind velocity values. At a measured wind direction or at a certain main wind direction in the case of changing wind directions, the pitch angle is determined at least with allowance for the target value of the predetermined azimuth angle and/or an actual rotational speed value.

In a variant of the method according to the invention already addressed above, power is supplied through the power supply system to which the wind power installation is connected. In this case, there is sufficient power supply for the consumers of the wind power installation such as, for example, the control unit, drives, measurement sensors, communication devices and the like such that an emergency or auxiliary supply is unnecessary. The transition to spinning mode then ensues upon a correspondingly large value for the predetermined wind velocity being exceeded, whereby the predetermined speed value ($v_1^*$) roughly corresponds to the cut-out velocity of the wind power installation.

A second design provides for an auxiliary generator designed to provide power at the predetermined range of rotational speed for the spinning mode and having its input shaft coupled to one of the shafts driven by the rotor. In this design of the method according to the invention, the auxiliary generator obtains the electricity necessary for the supply from the rotation of the rotor in spinning mode. The predetermined range of rotational speed is preferably of lower rotational speed compared to that of the regular operation of the wind power installation. Alternatively, the predetermined range of rotational speed can also be of a rotational speed as is the case in the regular operation of the wind power installation. In this case, a generator intended for regular operation can preferably serve as an auxiliary generator.

The auxiliary generator is preferably configured such that it can supply at least some of the electrical consumers in the wind power installation on a sustained basis.

In the event of a loss of the network connected to the wind power installation, the predetermined value for the wind velocity is preferably set to a low value such that the auxiliary generator can supply some of the consumers of the wind power installation. The predetermined value hereby corresponds roughly to the cut-in speed of the wind power installation. The control unit preferably determines the target value for the displacement angle for the at least one rotor blade dependent on the power needs of the consumers to be supplied in the wind power installation.

The object according to the invention is likewise achieved by a wind power installation itself. The wind power installation comprises a nacelle, at least one rotor blade and a control unit. The angular orientation of the nacelle is adjustable via at least one azimuth drive. The angular position of the one or plurality of rotor blades of the wind power installation is respectively adjustable about the longitudinal axis by means of one or a plurality of pitch drives. The control unit receives the measured values of wind velocity and wind direction and can process same. Above a predetermined wind velocity, the drives are controlled in a spinning mode such that the nacelle and the at least one rotor blade are set into an angular position predetermined by the control unit, preferably into the wind, whereby the at least one rotor blade rotates in the adjusted angular position at a rotational speed within a predetermined range. The wind power installation according to the invention is preferably provided with an electrical generator which is driven at a predetermined range of rotational speed by the at least one rotor blade for supplying power and which supplies at least some of the electrical consumers, in particular at least the control unit, wind sensor, azimuth drive and pitch drive.

BRIEF DESCRIPTION OF THE SEVERAL VIEWS OF THE DRAWINGS

Three flowcharts will be referred to in the following to describe three possible designs of the method according to the invention. Shown are.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated With initial reference to FIG. 1: the method according to the invention is initialized in a process step 10. In a subsequent query 12, the control unit analyzes whether the values for the measured wind velocity v are greater than a predetermined value $v_1^*$ for the wind velocity. The measured wind velocity value can be a momentary value or a value averaged over an interval of time so as to compensate for short-term fluctuations in wind speed. The predetermined value for the wind velocity $v_1^*$ is hereby preferably of an approximate magnitude of the customary cut-out speed for the wind power installation at which regular operation can no longer take place due to high wind forces.

Figure 1:
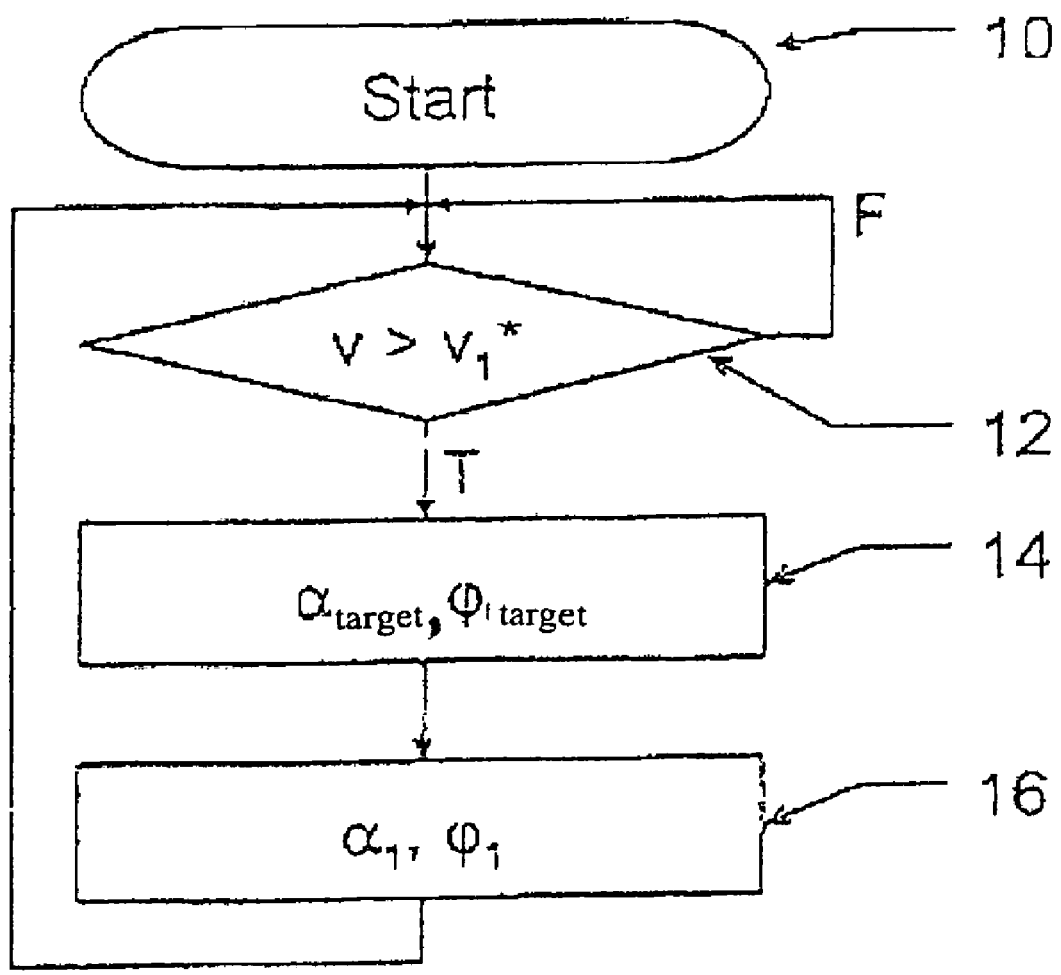
FIG. 1 a flowchart for the method according to the invention which switches into a controlled spinning mode upon a predetermined wind velocity value $v_1^*$ being exceeded, FIG. 2 the procedural flow of the method according to the invention which, upon power supply loss, switches into the controlled spinning mode, and FIG. 3 a control method which switches into a controlled spinning mode in both the case of a first wind velocity $v_1^*$ being exceeded as well as upon power supply loss in order to supply the consumers of the wind power installation.

When the measured wind velocity v exceeds the predetermined limiting value for the wind velocity $v_1^*$, the control unit calculates a target value for the azimuth angle α_target and the pitch angle φ_target of the rotor blades in a subsequent step 14. To achieve an even load on the rotor blades, all the rotor blades are preferably set to the same pitch position. The target values α_target and φ_target are hereby calculated such that the wind power installation is decelerated from its current rotational speed to a lower rotational speed value as a function of the predetermined target value set by control unit in step 16. The wind power installation then rotates at a lower yet predetermined rotational speed. Not shown in FIG. 1 is a controller which can be provided for the purpose of stabilizing the predetermined rotational speed. Should the rotational speed achieved at angles α and φ deviate faster or slower from the predetermined rotational speed interval, a control action will then follow to the effect that the rotational speed reverts back to the desired range of rotational speed. The nacelle remains turned toward the wind in this method.

The special advantage to the method shown in FIG. 1 consists of the spinning mode with a lower rotational speed allowing the wind power installation to remain stable even during storms. The slow rotating of the rotor prevents stresses and forces developing from the incident wind or storm which could damage the wind power installation. The rotation of the rotor blades also means that sudden gusts are no longer critical. Spinning mode increases the stability of the wind power installation such that same can be configured correspondingly.

Figure 2:
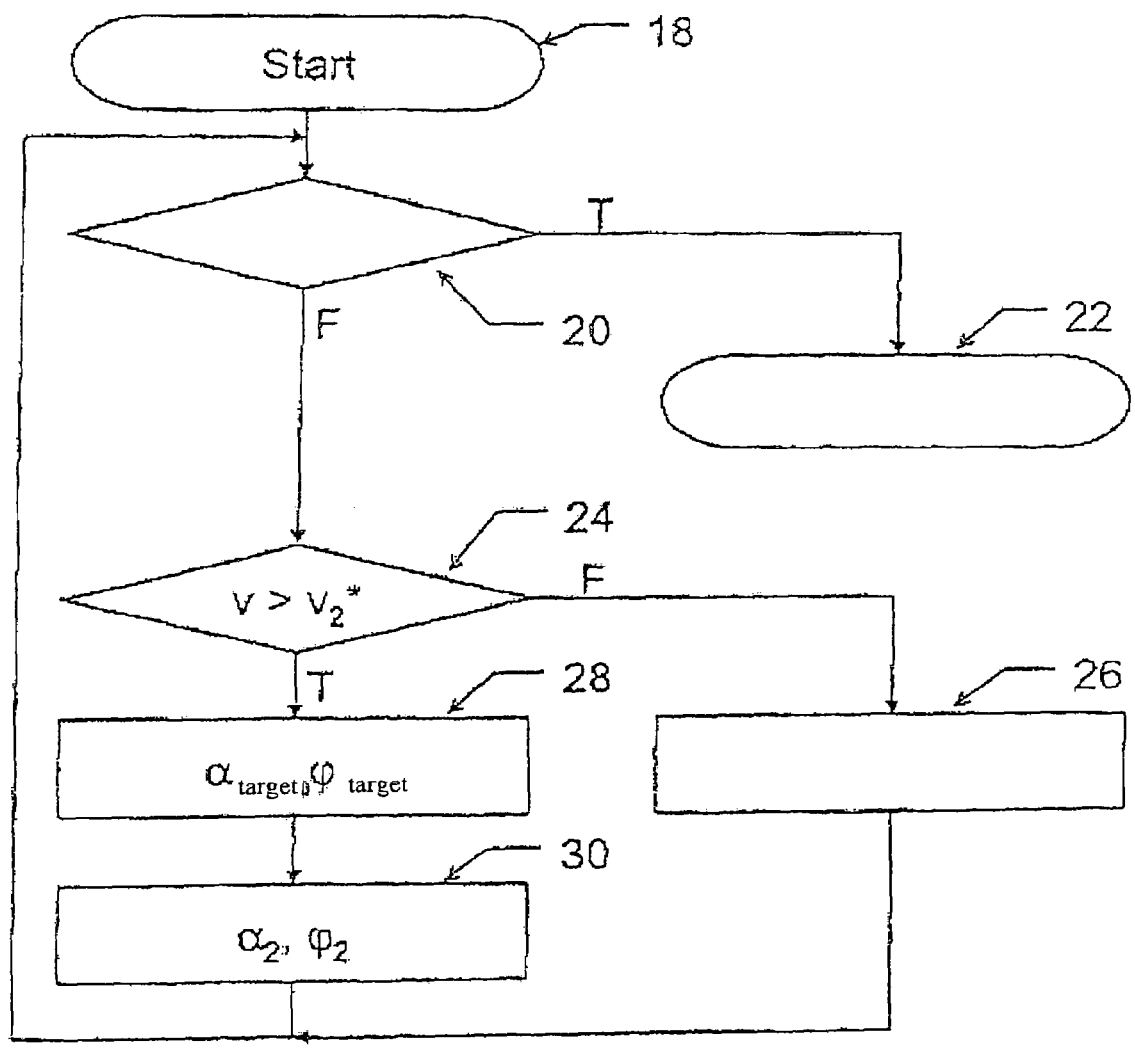

FIG. 2 shows a further application of the controlled spinning mode in which, following an initialization 18, a query 20 checks whether the power supply system connected to the wind power installation for the supply of electricity is available. If the power supply system is available, a further control or adjustment can follow in method step 22, for example also with the method shown in FIG. 1, as will be described in greater detail below. If the power supply system has failed, step 24 checks whether a measured wind velocity v is greater than a predetermined minimum wind velocity $v_2^*$. The minimum wind velocity $v_2^*$ is hereby dimensioned such that the electrical consumers in the wind power installation can be supplied with power by an auxiliary generator from the wind. If the measured wind velocity does not exceed the predetermined minimum value for the wind velocity, the steps necessary to safeguard the wind power installation in the event of loss of power supply are initiated in step 26. These could include adjustment of the rotor blades into the flag position, securing and shutting down the control unit, starting emergency power systems and the like.

Should, however, the power obtainable from the wind in the event of loss of power suffice for an auxiliary generator connected to the rotor to produce sufficient electricity for the wind power installation, the control unit then determines the target values for the azimuth and pitch angles in step 28 such that the wind power installation runs at a rotational speed suitable for the auxiliary generator as a function of the predetermined angles $\alpha$ and $\phi$ being set in step 30.

The use of an electrical auxiliary generator driven by the rotor in the case of power failure enables the wind power installation to remain independent of an external power supply or have sufficient power available from connected auxiliary systems to supply the electrical consumers and thus continue to function properly on a sustained basis.

Figure 3:
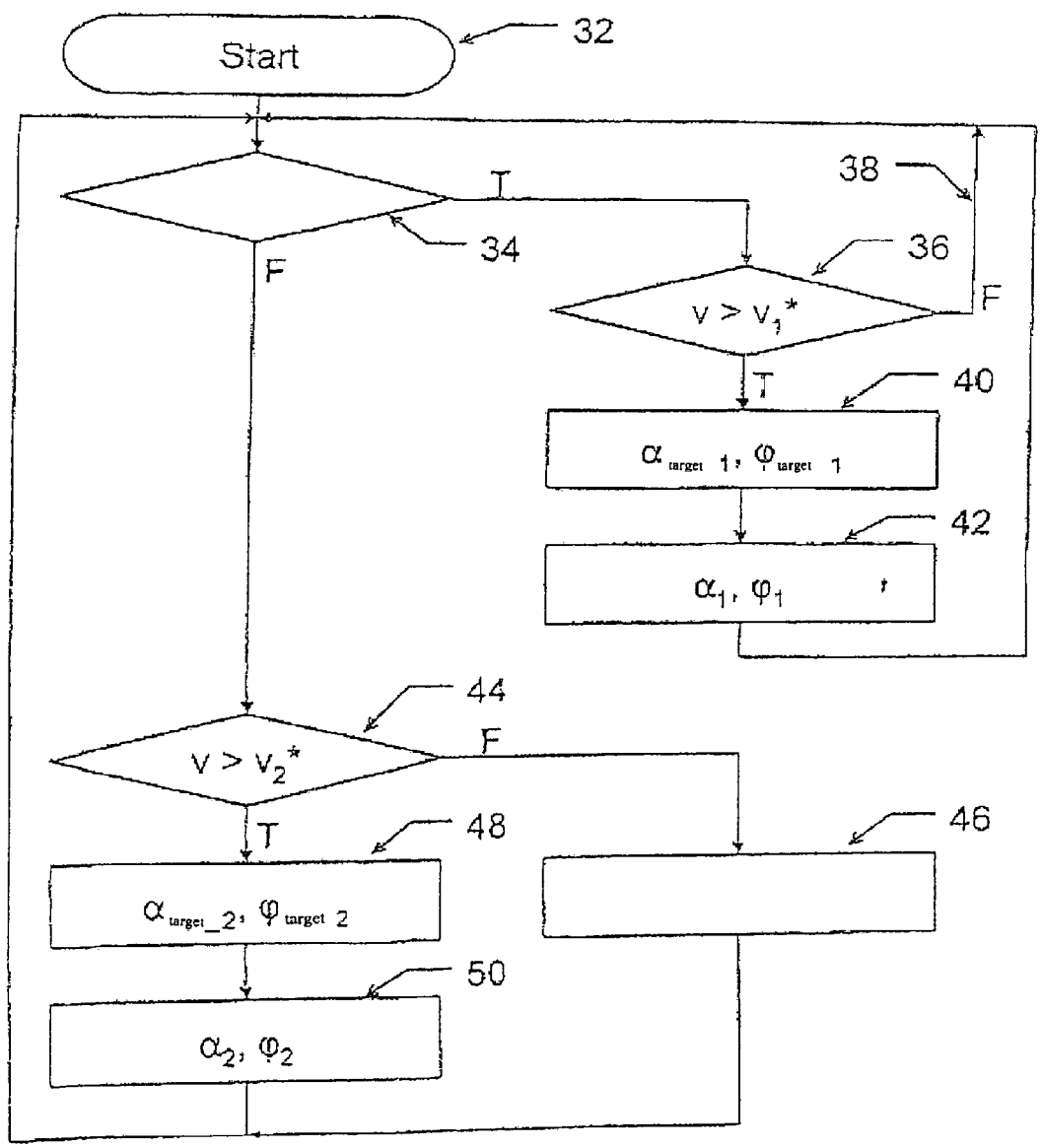

FIG. 3 shows a particularly preferred combination of the two methods. In the method shown in FIG. 3, following the initialization of the method in step 32, a query is first made in step 34 as to whether power can be supplied from the power supply, respectively the regular power produced by the generator.

If query 34 indicates that a sufficient power supply is available, the subsequent step 36 then checks whether the measured wind velocity exceeds a predetermined value $v_1^*$. Should this not be the case, this portion of the method backtracks to its initial position via the branch 38 and a regular control or adjustment of the wind power installation to realize maximum output can follow (not shown).

Conversely, should the measured wind velocity v exceed the predetermined value $v_1^*$, a first target value for the azimuth angle and the pitch angle ($\alpha$_target_1 and $\phi$_target_1) is calculated in step 40. These angles are determined by the control unit in such a way that the wind power installation is decelerated to a predetermined range of rotational speed as a function of the angles as set in method step 42. The $\alpha$_1 and $\phi$_1 angles achieve a stable spinning mode in which the wind power installation trundles at strong winds ($v > v_1^*$).

On the other hand, if the query 34 determines that the power supply has failed, step 44 queries as to whether the wind velocity is high enough to supply sufficient electricity via an auxiliary generator. Should this not be the case, similar to the method in FIG. 2, the appropriate emergency measures to safeguard the wind power installation are initiated in step 46.

However, if query 44 yields that the wind is strong enough ($v > v_2^*$) to obtain electricity to supply the wind power installation from the auxiliary generator, the corresponding target values for the azimuth angle and the pitch angle ($\alpha$_target_2, $\phi$_target_2) are calculated in step 48. According to the angles set in method step 50, the auxiliary generator produces the electricity sufficient to operate the wind power installation without supplying same to the network.

For the sake of simplicity, the above-cited examples of controlled spinning mode for the wind power installation describe only the controlling of the azimuth angle and the pitch angle. It has hereby been assumed that the wind power installation switches into the predetermined range of rotational speed after a certain length of time. The predetermined range of rotational speed can, however, also be regulated by, for example, measuring the actual value for the rotational speed and allowing for same when determining the target value for the angles.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for controlling and adjusting a wind power installation having a nacelle displaceable by an azimuth angle, at least one rotor blade displaceable about its longitudinal axis, and a power supply in a spinning mode, wherein the method comprises the following steps:
 a control unit determines an angular position for the nacelle and one or more displacement angles for the at least one rotor blade from measured values (v) from the measured wind velocity and wind direction upon a measured wind velocity exceeding a predetermined speed value ($v_1^*$, $v_2^*$),
 at least one azimuth drive fed by the power supply sets the nacelle into the angular position ($\alpha$) determined by the control unit and at least one pitch drive fed by the power supply sets the at least one rotor blade into the angular position ($\phi$) determined by the control unit, wherein the at least one rotor blade rotates in the set position at a rotational speed within a predetermined range of rotational speed.

2. The method according to claim 1, characterized in that the control unit determines the target value(s) for the displacement angle for the at least one rotor blade dependent on at least the calculated azimuth angle and/or the actual rotational speed value.

3. The method according to claim 1 or 2, characterized in that the power is supplied through the power supply system to which the wind power installation is connected, wherein the predetermined speed value ($v_1^*$) roughly corresponds to the cut-out velocity of the wind power installation.

4. The method according to any one of claims 1 to 3, characterized in that an auxiliary generator is provided which is designed to supply power at the predetermined range of rotational speed and the input shaft of which is coupled to one of the shafts driven by the rotor.

5. The method according to claim 4, characterized in that in the event of a loss of the network connected to the wind power installation, the predetermined value for the wind velocity is set to a value ($v_2^*$) such that the auxiliary generator can supply at least some of the consumers of the wind power installation.

6. The method according to claim 5, characterized in that the predetermined value ($v_2^*$) roughly corresponds to the cut-in speed of the wind power installation.

7. The method according to any one of claims 4 to 6, characterized in that the predetermined range of rotational speed is of a lower rotational speed than that in a regular operation of the wind power installation.

8. The method according to any one of claims 4 to 6, characterized in that the predetermined range of rotational speed exhibits rotational speeds as occur during a regular operation of the wind power installation.

9. The method according to any one of claims 4 to 8, characterized in that a generator designed for regular operation is provided as the auxiliary generator.

10. The method according to any one of claims 4 to 9, characterized in that the auxiliary generator is configured to supply at least some of the electrical consumers in the wind power installation, wherein said consumers comprise at least the control unit, wind sensor, azimuth drive and pitch drive.

11. The method according to any one of claims 4 to 10, characterized in that the control unit determines the target value(s) for the displacement angle for the at least one rotor blade dependent on the power needs of the electrical consumers to be supplied in the wind power installation.

12. A wind power installation comprising a nacelle, the angular orientation of which is adjustable by means of at least one azimuth drive, at least one rotor blade, the angular position of which is adjustable about its longitudinal axis by means of respectively one or a plurality of pitch drives, a control unit having measured values of wind velocity and wind direction, and a power supply which supplies at least the drives with electricity, characterized in that in a spinning mode above a predetermined wind velocity ($v_1^*$, $v_2^*$), the control unit controls the drives such that the nacelle and the at least one rotor blade are in an angular position predetermined by the control unit such that the at least one rotor blade rotates at a rotational speed within a predetermined range of rotational speed.

13. The wind power installation according to claim 12, characterized in that an electrical generator designed for the predetermined range of rotational speed is provided which is driven by the at least one rotor blade for supplying power and which supplies at least some of the electrical consumers of the wind power installation, wherein said consumers comprise at least the control unit, wind sensor, azimuth drive and pitch drive.

* * * * *